United States Patent [19]

Penz

[11] Patent Number: 4,547,043
[45] Date of Patent: * Oct. 15, 1985

[54] STACKED LCD GRAPHICS DISPLAY

[76] Inventor: Perry A. Penz, 2203 Eastwood Dr., Richardson, Tex. 75080

[*] Notice: The portion of the term of this patent subsequent to Dec. 14, 1999 has been disclaimed.

[21] Appl. No.: 341,976

[22] Filed: Jan. 22, 1982

Related U.S. Application Data

[63] Continuation-in-part of Ser. No. 172,108, Jul. 25, 1980, Pat. No. 4,364,039.

[51] Int. Cl.[4] ............................................. G02F 1/13
[52] U.S. Cl. ..................................... 350/335; 350/333; 350/337
[58] Field of Search .......................... 350/333, 335, 337

[56] References Cited

U.S. PATENT DOCUMENTS

| | | | |
|---|---|---|---|
| 3,645,604 | 2/1972 | Ngo | 350/335 |
| 3,655,269 | 4/1972 | Hillmeier | 340/784 X |
| 3,661,444 | 5/1972 | Matthies | 350/335 |
| 3,873,186 | 3/1975 | Ritchie | 350/335 |
| 3,977,767 | 8/1976 | Okuma et al. | 350/335 X |
| 3,982,239 | 9/1976 | Sherr | 340/784 X |
| 3,992,082 | 11/1976 | Katz | 350/335 |
| 4,039,254 | 8/1977 | Harsch | 350/335 |
| 4,099,855 | 7/1978 | Wisbey et al. | 350/333 |
| 4,217,160 | 8/1980 | Perregaux | 350/337 X |
| 4,231,640 | 11/1980 | Funada et al. | 350/335 X |
| 4,232,948 | 11/1980 | Shanks | 350/335 X |
| 4,241,339 | 12/1980 | Ushiyama | 340/784 X |
| 4,364,039 | 12/1982 | Penz | 350/335 X |
| 4,403,832 | 9/1983 | Tanaka et al. | 350/335 |

FOREIGN PATENT DOCUMENTS 0053316 4/1980 Japan ................................ 350/335

OTHER PUBLICATIONS

Alt, P. M. et al., "Scanning Limitations of Liquid-Crystal Displays," 21 *IEEE Transactions on Electron Devices*, 146, (1974), pp. 146-155.

*Primary Examiner*—John K. Corbin
*Assistant Examiner*—Richard F. Gallivan

[57] ABSTRACT

A visual display and method for producing the same. A plurality of electro-optic cells, such as liquid crystal cells, are placed in an optical series. Each of the cells receives approximately simultaneous identical signals. Due to the series relationship, the resulting contrast ratio will be significantly improved. The transmission function acting on the entering light will be squared after the second electro-optic cell, cubed after the third cell, etc. The enhanced transmission function has a vastly improved rise after the threshold voltage, i.e. greater nonlinearity allowing for greater multiplexing capability. Plastic LCDs are preferably used, and their very small thickness avoids parallax effects.

10 Claims, 8 Drawing Figures

STACKED LCD GRAPHICS DISPLAY

CROSS-REFERENCE TO RELATED APPLICATION

The present application is a continuation-in-part of Ser. No. 172,108, filed July 25, 1980, U.S. Pat. No. 4,364,039.

BACKGROUND OF THE INVENTION

This invention relates to a visual output device which uses electro-optic cells such as liquid crystal cells. Such output devices are commonly used in calculators, watches, electronic thermometers, or the like.

With the advent of hand-held devices came the need for effective visual output means which could be powered using a low voltage. The liquid crystal cell has been widely accepted in the industry due to its ability to be constantly visible to the user, its low cost, its low voltage generation, and its relatively low power demand. An electro-optic cell may be characterized as a device which will selectively transmit light depending on the electrical energy applied. Commonly these cells use a liquid crystal material. Alternatives include, e.g.., electrophoretic cells.

There are many applications where it would be highly desirable to have a flat display with no gray scale. The gray scale available with a CRT is not necessary for the many applications where only character and graphic display is required. For example, most of the video output uses of a small computer could be accommodated by such a grahics display. However, for many of these applications a recently large display area (such as a thousand pixels are better) is desirable.

For information content higher than the 23 segments in a standard digital watch display, multiplexing the display is essential to avoid excessive chip/display interconnections. Multiplexing involves exciting one pixel and moving quickly to another operation. Given the X-Y matrix used in multiplexing, a given pixel receives excitation signals during the whole addressing cycle, not just at the time it is specifically addressed. In order for the drive technique to work, the pixel in question should not respond to the extra signals. This means that the electro-optic response (transmission function) of the device must have a threshold characteristic. The extent to which the display turns on in a multiplex drive scheme is related to the steepness or slope of the transmission vs. voltage curve above threshold. The sharper this transition, the more lines which can be addressed and consequently the more data that can be presented. For many nonemissive type displays, e.g., liquid crystals, the sharpness of this transfer function is poor, leading to a limited level of multiplexing and a limited information content. A general reference on matrix-addressed LCD arrays is Alt & Pleshko, "Scanning Limitations of Liquid-Crystal Displays," 21 IEEE *Transactions on Electron Devices* 146 (1974), which is hereby incorporated by reference.

SUMMARY OF THE INVENTION

Although the preferred embodiment of the invention uses LCD's, the present invention may also be applied to enhance the nonlinearity of other types of electro-optic cells a device which will transmit light in nonlinear relation to applied voltage to permit operation of a large fully-matrix-addressed array.

Note initially that the contrast ratio of a liquid crystal cell as a function of voltage, past the threshold voltage, is a nonlinear concave down function, as exemplified in L. A. Goodman's article, "Liquid Crystal Displays", Journal of Vacuum Science Technology, Vol. 10, No. 5, September/October 1973, page 804-8923 at 817. This function exemplifies the need for a disproportionate amount of voltage to achieve a given degree of darkening or opaqueing in a liquid crystal cell at a higher level of opacity.

A second relevant phenomenon is that a device which has a transmission function T will, when put in series with a similar device, result in an overall system having a transmission function of $T^2$. Hence, input of $I_{in}$ will have, after the first device, output $I_{out} = I_{in} T$; the output after the second device in series is $I_{out} = I_{in} T^2$. This relationship may be carried on ad infinitum and is applicable to enhance the nonlinearity of the transmission function of an electro-optic cell. The transmission function is determinative of the contrast ratio.

The present invention involves positioning two or more independent electro-optic cells in an optical series, and driving each of the cells in a series with approximately simultaneously identical signals. As the light entering the optical series passes from one cell to the next, the net transmission function is squared, cubed, etc., so that the contrast ratio is greatly enhanced.

The need for approximately simultaneous signals to each cell within a series is important for the invention. The optical series of cells must react identically; that is, identically within the ability of the observer to differentiate in time.

Obviously, there is some practical limit on the number of cells which can be put in optical series and still have a device with distinguishable "off" and "on" states. This practical limit is controlled by the amount of absorption (or scattering) generated by the cell in its inactive or "off" stage. Every electro-optic cell diffuses some light, even in its "clear" state.

This is simply a human-factor limitation: not only must the contrast ratio be adequately high (preferably 5 to 1 or better), but the luminance of the bright portion of the display should be high enough that this contrast ratio is actually useful to the observer. For example, a reflected display which had a ten percent reflectance in its bright portions would be unacceptable, even if the contrast ratio was greater than 5 to 1. Of course, this limitation may be circumvented, for example, by using a back-illuminated LCD transmission display. However, even this arrangement would impose some constraint due to the power necessary to generate the backlight. These effects place the strongest limitation on the applicability of displays according to the present invention which have more than two layers.

As those skilled in the art will realize, to achieve the desired results, the electrodes which define the image areas in each liquid crystal cell must be aligned so that the display will be "crisp". As they become nonaligned, the resulting display will be fuzzy or blurred since the dark part of the cells would not lie in optical series.

Various modifications to the above invention are obvious to those skilled in the art. Some of these modifications include using a means for reflection, such as a mirror, placed at the end of the optical series of cells to reflect the light back through the optical series of cells before exiting the system to some observer.

The above optical series and associated mirrors or polarizers constitute an optical channel. In practice, the construction of this optical channel requires that the distance between pixels within an optical series must be much less than pixel's width. Light entering the first pixel must effectively enter the next pixel at approximately the same relative point to achieve the optical series requirements discussed earlier. Thus, in an LCD embodiment, plastic LCDs are preferably used. Because their thickness is so small, high-resolution pixel widths may be used without optical degradation due to parallax effects.

The invention as described is particularly applicable to multiplexing. As discussed above, the multiplex capability of a display depends on the sharpness of the transmission function. For a stacked display, the displays being optically independent, the transmission function is raised to a power depending on the number of displays in the stack. When a nonlinear function is raised to a power, the sharpness of the function is typically increased. In this context, sharpness refers to the "slope" of the transmission function within a selected area. This invention allows for a much quicker rise of contrast ratio with voltage. For a more in-depth discussion on multiplexing techniques, refer to Jacques Robert and Bruno Dargent's article "Multiplexing Techniques for Liquid-Crystal Displays", IEEE Transactions on Electron Devices, Vol. ED-24, No. 6, June 1977, pages 694–697 which is hereby incorporated by reference.

Thus the present invention stacks parallel arrays of plastic LCDs in an array of optical channels, to achieve a large higher-resolution high-contrast graphics display which has a good viewing angle. Further background on plastic LCDs is found in U.S. Pat. No. 4,228,574, which is hereby incorporated by reference. Stacked LCDs are also disclosed in U.S. Patent Application Ser. No. 172,108, filed July 25, 1980 (of common ownership and inventorship), which is hereby incorporated by reference.

The invention, will be more fully explained by the following figures and their accompanying descriptions.

DESCRIPTION OF THE PREFERRED EMBODIMENTS

Figure 1A:
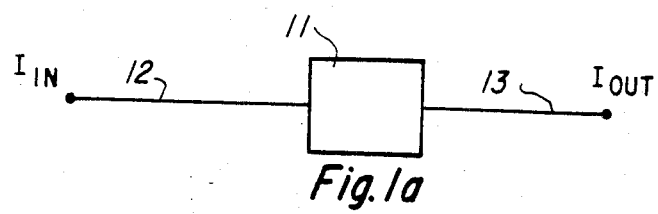
FIGS. 1a and 1b illustrate the squaring relationship of two black boxes having identical transfer functions.
Figure 1B:
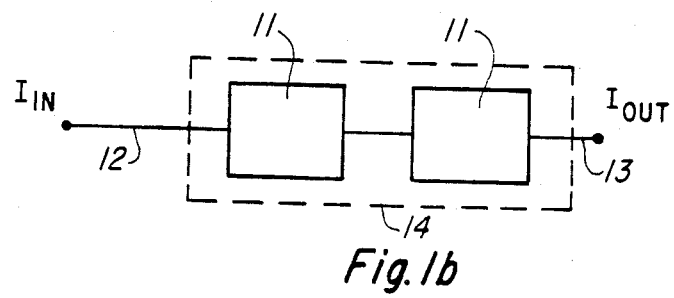

In FIG. 1a, suppose black box 11 has a transfer function, T. That is to say, input 12, $I_{in}$, will be transformed to give an output 13, $I_{out}$, defined by the function $I_{out} = T(I_{in})$. Two of these black boxes 11 then form a system 14 which has a transformation function $T^2$. This general principle is true for an optical transfer function in series as well as electrical functions set in series.

Light entering a first independent cell will be modulated by T; similarly the second cell (if identically driven) will modulate by T as well. As example: suppose each cell has an 80% transmission, light exiting the first cell is (0.80) L where L is the light entering the first cell. The (0.80) L enters the second cell which modulates the light again by 80% resulting in (0.80) (0.80)L $= (0.80)^2 L$ exiting the series.

Figure 2:
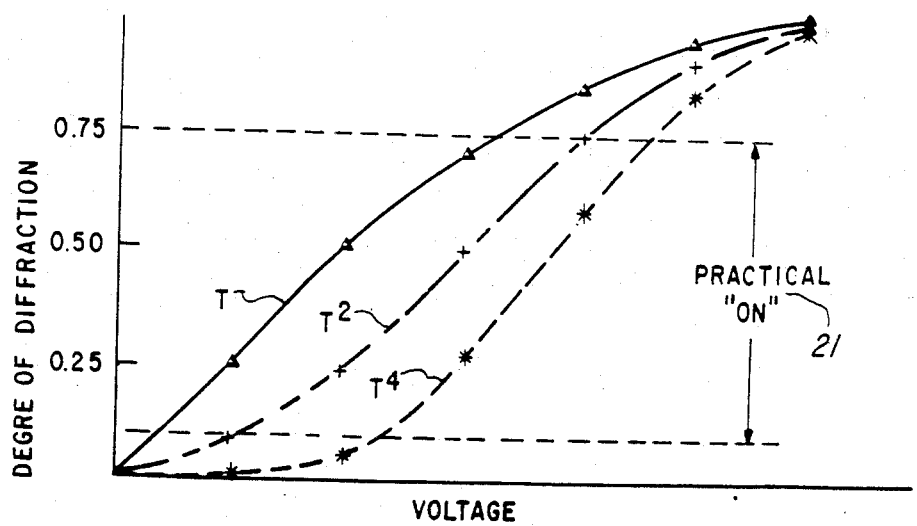
FIG. 2 graphically shows the nonlinearity gained through squaring and quadrupling transfer function.

FIG. 2 graphically illustrates the advantage gained by the series relationship. A sine function is used only as illustrative of the degree of diffraction as a function of voltage. The sine function is a fair approximation to the transfer function of light past the threshold voltage. Within the practical "on" zone 21, the function t is nearly linear, whereas the $T^2$ and $T^4$ functions are concave up. This means that a little increase in voltage within this zone will have more distinctive darkening for the $T^2$ or $T^4$ functions than for the T function. This change in curve structure permits added multiplexing opportunity.

Figure 3:
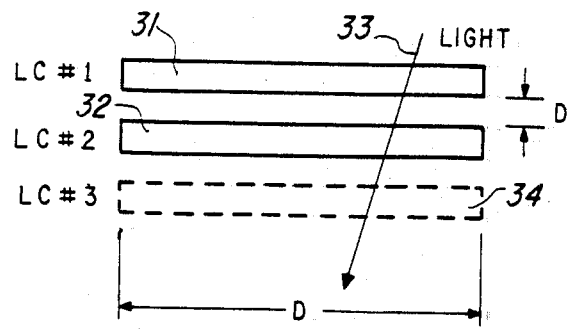
FIG. 3 is a cross section of the conceptual optical path considerations for the invention.

In FIG. 3, light ray 33 enters the top electro-optic display cell 31 and then passes through to a second electro-optic cell 32. To keep the beam of light passing through the same relative points, the pixel to pixel distance, D, must be much less than the pixel width, d. It has been determined that values of D=10 mils and d=25 mils will produce acceptable results. These two results are given only as examples of values for which the invention will work and are not to be restricting or limiting upon the invention. As the ratio d/D becomes larger, the parllax limits permit a broader range of viewing angles.

The number of cells in series is discretionary, but is practically bounded (due to the insertion loss of the polarizers) by the number of cells in series which can still have practicably distinguishable "on" and "off" states, as discussed above.

Figure 4:
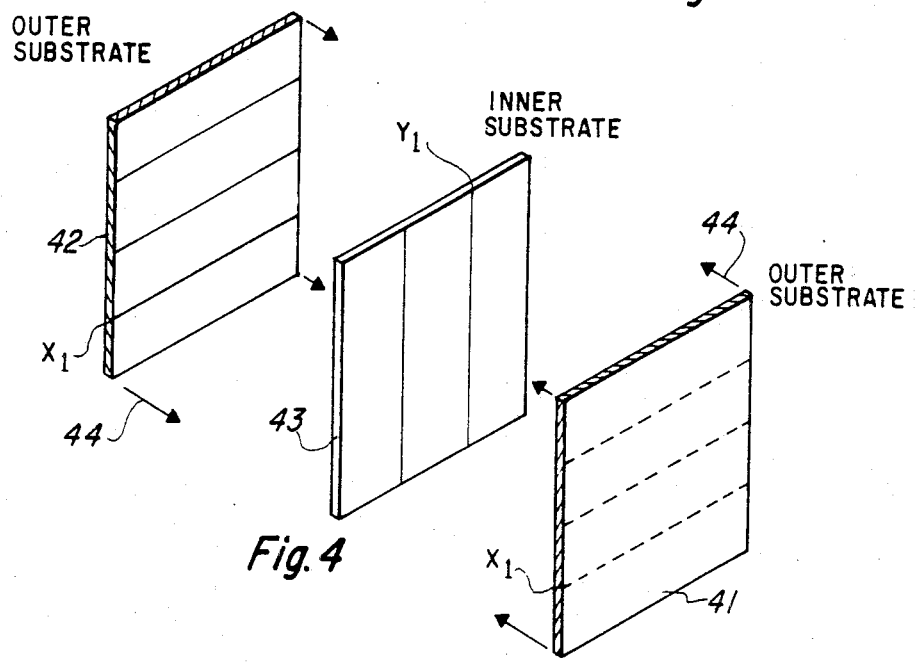
FIG. 4 is a pictorial representation of a preferred embodiment of the invention.

A key feature of the invention is that each of the cells in the optical channel receives approximately simultaneous identical signals. FIG. 4 illustrates the preferred embodiment of the invention which will accomplish the above tasks.

In FIG. 4, outer substrates 41 and 42 each have parallel electrodes embodied on them. These electrodes will form the "X" axis. Inner substrate 43 has embodied parallel electrodes forming the "Y" axis. The "Y" axis electrodes are on both sides of the inner substrate 43. Through cavity regions or other methods known to those in the art, a quantity of liquid crystal material is mantained between each of the outer substrates and the inner substrate while the three substrates are sealed to each other. The direction of sealing is indicated by arrows 44. The liquid crystal material is not illustrated in this drawing, nor is the means for sealing.

The "X" axis electrodes on each outer substrate are then each coupled to their respective associated mates on the other outer substrate, so that a signal to $X_1$ on the outer substrate 41 to be approximately simultaneously communicated to $X_1$ on the outer substrate 42. Similarly, the $Y_1$ electrical lead on one surface of the inner substrate 43 is connected to the $Y_1$ electrode on the opposite surface. The $X_1$ electrodes of each outer substrate must be as close to being in registered alignment as possible to maximize the crispness of the display. Similarly the Y leads must also be in the same aligned relationship. As noted before, as the associated electrodes become nonaligned, the required optical series is diminished resulting in a blurred or fuzzy display.

By having a matrix of X by Y leads, a total of XY cells may be addressed using only X+Y leads. By way of example then, a 10×10 matrix needs only 10+10 or 20 leads, but may address 100 electro-optic cells.

The use of three substrates, as discussed above, may be optimum but it is not controlling upon the invention. Two independent cells each with two substrates, may be connected to each other to produce the identical result. In this method then, four substrates are used, two for each cell. Apparent from this is that the actual number of substrates used in the invention is open to selection by the designer.

Figure 5:
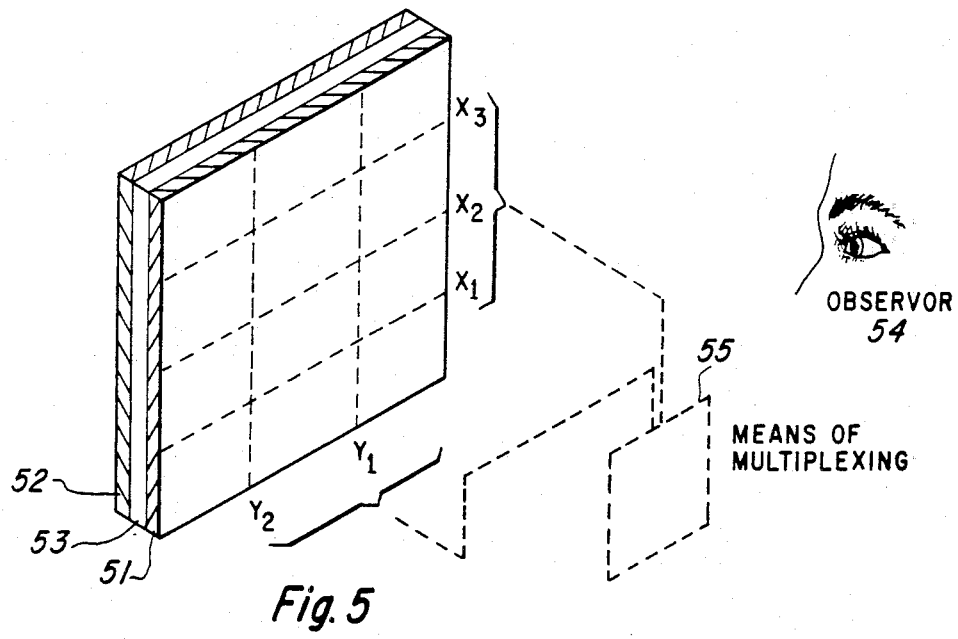
FIG. 5 is a pictorial representation of the invention in operation.

FIG. 5 illustrates the completed invention as described in FIG. 4 in operation. Again, three substrates are used, outer substrate 52, outer substrate 51 and inner substrate 53. Note again that the use of three substrates is not critical to the invention, which may have multiple substrates including four. The electrodes on these three substrates form the matrix having $X_1$, $X_2$, and $X_3$ as one axis while $Y_1$, and $Y_2$ form the second axis. Means for multiplexing 55 may be coupled to these electrodes to provide signals to them using multiplexing techniques known in the art. Observer 54, through this invention, is provided a higher contrast ratio and improved visual display.

The detailed structure of the preferred embodiment of the present invention will now be discussed in greater detail.

Each matrix of LCD cells should have a lateral spacing between cells of at least 10 mils (0.01 inches), since a smaller lateral spacing will simply not be perceptible. A lateral spacing of 20 mils would probably be optimal, but this would of course vary depending on the application.

Figure 6:
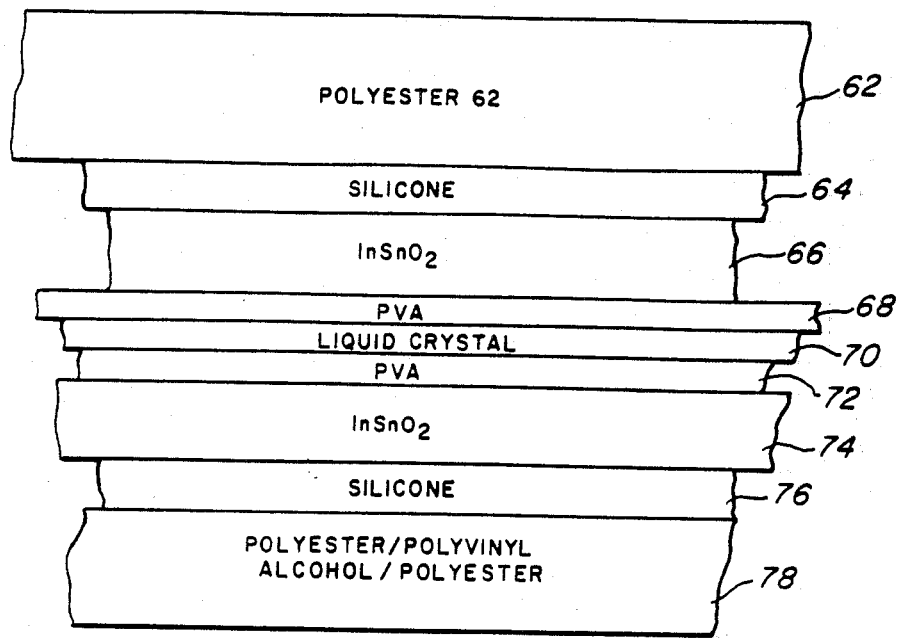
FIG. 6 is a sectional view of one pixel of the display, comprising two stacked LCD elements.

As shown in FIG. 6, each LCD matrix includes a substrate 62 for mechanical support, which may be, for example, polyester plastic 7 mils thick. The minimum substrate thickness is defined by processing technology at present, since warpage during processing must be avoided. However, the present invention can be practiced to even greater advantage with thinner substrates (down to 2 mils at least) if manufacture using such substrates is practical. (Cellulose acetate butyrate may alternatively be substituted for polyester). Next is a sealant layer 64, comprising, e.g., a ½ mil thickness of silicone. The sealant layer may optionally be omitted where a polyester substrate is used, since polyester has good sealing characteristics itself. Next is a plurality of parallel transparent conductor strips 66, each comprising, e.g., a 30nm thickness of $In,Sn,O_2$. Next, an alignment layer 68, comprising e.g., 10nm of polyvinyl alcohol is provided. Next is the liquid crystal material itself, which may be e.g., 10 micron thick. There follows another alignment layer 72, a second transparent conductor layer 74, and a further sealant layer 76.

Last is a polarizer 78, comprising a thin layer of polyvinyl alcohol sandwiched between polyester layers, for thickness of 8 to 10 mils total. A second LCD matrix may then be stacked atop the first one, as discussed above simply by repeating the sequence of layers 62-76 described above in reverse order. In addition, a mirror may be provided below the bottom layer, simply by evaporating aluminum onto the bottom polyester layer 62. Note that, in any case, a polarizer layer must be supplied between each liquid crystal cell in an optical series, in order to decouple the respective cells within each optical path, so that their transmission functions will be algebraically multiplied as discussed above. An abrasion-resistant coating will typically be used over the outermost plastic substrate, for mechanical protection. For clarity, the data lines and scan lines have been shown relatively narrow, although in fact they are made as wide as possible without causing lateral shorts. The liquid crystal material itself is not partitioned and the active pixel areas are simply defined by the oppositions of data lines and scans. Thus, the lateral separation of conductors corresponds to unmodulated area, which degrades the signal-to-noise ratio.

Using this arrangement, a vertical distance of about 10 mils center to center is achieved between pixels within the optical series. Thus, a good range of viewing angles is achieved. By making the lateral spacing between pixels larger, or by making the polarizer thinner, even better viewing angle may be attained.

Figure 7:
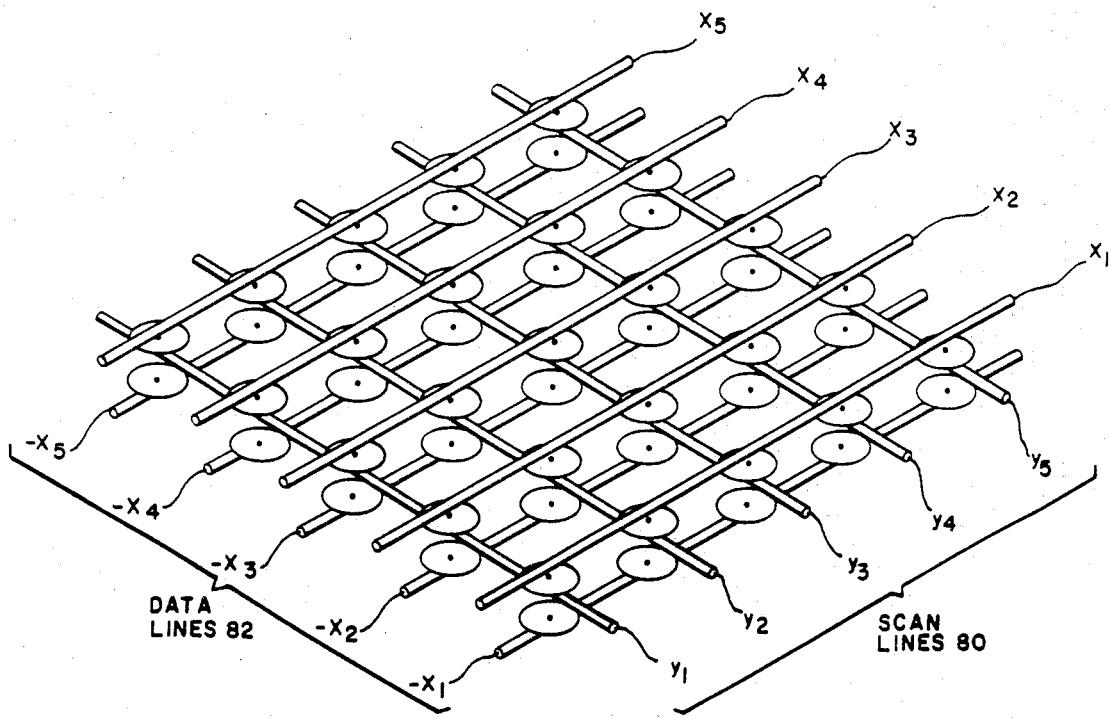
FIG. 7 shows generally the circuit connections of a fully-matrix-addressed LCD array.

A fully-matrix-addressed display according to the present invention is shown in greater detail in FIG. 7. An m by n pixel matrix is driven by a set of m data lines 82 and a set of n scan lines 80. The number of data lines 82 which may be used is unlimited, but the number n of scan lines 80 must be carefully selected in accordance with the desired optical response, as will be discussed below.

Typically the scan lines will be sequentially scanned repeatedly, at a rate of 30 miliseconds per full scan cycle. As each scan line $Y_k$ is addressed, it is raised to voltages which is optimized at $V_{th} \times n$, where $V_{th}$ is the threshold voltage of each optical series of pixels as discussed above. The quiescent scan lines remain at 0 voltage. As each scan line is addressed, the data lines $X_k$ and $-X_k$ are modulated to a plus or minus $V_d$ voltage, in accordance with the desired state of each particular pixel addressed by the scan line and the respective data line. Thus, a given pixel sees a high voltage scan pulse for 1/n time fraction, and a grounded scan electrode for the rest of the scan cycle, opposed by a continuous series of plus or minus $V_d$ data signals. The data signals for "on" and "off" are equal in amplitude but opposite in sign, so that the data signals to the other n−1 scan lines will not affect the RMS signal of the pixels on one particular scan line.

By this arrangement, even though the time constant for one LCD pixel to change is around 100 milliseconds, the RMS behavior of each pixel is adequately controlled, by applying enough energy to each pixel in 30 milliseconds divided by n to give it the desired average signal. Thus, if the scan voltage is written as $V_s$, each scanned pixel will receive a pulse energy proportional to $(V_s-V_d)2$ if off, and $(V_s+V_d)^2$ if on. Since any unscanned pixel will see a voltage of + or $-V_d$ during each scan cycle, the mean square voltage, over one whole 30 millisecond scanning cycle, seen by each pixel is as follows:

$$[(V_s-V_d)^2+V_d^2(N-1)/n]$$

if off; then $$[(V_s+V_d)^2+V_d^2(n-1)/n]$$

if on.

This calculation shows an important limitation on the number of scan lines which can be used in a matrix-addressed-array according to the present invention: first, as n increases, both on and off state RMS pixel voltages approach $V_d$. Thus, since $V_d$ cannot exceed the threshold voltage of the device, the contrast requirements may place a ceiling on the possible number of scan lines. Second, as the number of scan lines increases, the magnitude of the scan voltage $V_s$ increases, in order to get enough energy into each scan pixel. However, the materials used, or the active driver elements used, may place voltage limitations on the maximum $V_s$ which is practical.

Thus, the effect of the present invention, as applied to a fully-matrix-address LCD array, is to increase the number of scan lines which can be used. Since an unlimited number of data lines can be used, improvement in the number of scan lines is crucial. In particular, the present invention permits construction of an array having dozens of scan lines, which has not heretofore been possible.

What is claimed is:

1. A graphics display comprising:
    a first LCD matrix, comprising a planar area of liquid crystal material; a plurality of parallel data lines, and a plurality of parallel scan lines, said scan lines being orthogonal to said data lines, and said plurality of scan lines and said plurality of data lines being on opposite sides of said planar area of liquid crystal material, said data lines and said scan lines defining a plurality of liquid crystal pixels respectively interposed between a respective one of said scan lines and a respective one of said data lines;
    a second LCD matrix, comprising a planar area of liquid crystal material, a plurality of parallel data lines, and a plurality of parallel scan lines, said scan lines being orthogonal to said data lines, and said plurality of scan lines and said plurality of data lines being on opposite sides of said planar area of liquid crystal material, said data lines and said scan lines defining a plurality of liquid crystal pixels respectively interposed between a respective one of said scan lines and a respective one of said data lines, said first and second LCD matrices being optically aligned;
    a polarizer interposed between said first and second LCD matrices; and
    means for driving respective correspondingly aligned ones of said pixels of said first and second LCD matrices with corresponding signals.

2. The display of claim 1, further comprising a mirror parallel and adjacent to one of said LCD matrices.

3. The display of claim 1, further comprising:
    a third LCD matrix, comprising a planar area of liquid crystal material, a plurality of parallel data lines, and a plurality of parallel scan lines, said scan lines being orthogonal to said data lines, and said plurality of scan lines and said plurality of data lines being on opposite sides of said planar area of liquid crystal material, said data lines and said scan lines defining a plurality of liquid crystal pixels respectively interposed between a respective one of said scan lines and a respective one of said data lines, said first, second, and third LCD matrices being parallel, proximate, and optically aligned; and
    a second polarizer interposed beween said second and third LCD matrices;
    wherein said driving means drives said respective corresponding aligned pixels of said first, second and third LCD matrices with corresponding signals.

4. The display of claim 1, 2 or 3, wherein the separation of said first and second LCD matrices is not more than 10 mils.

5. The display of claim 4 wherein said first and second LCD matrices each respectively comprise a plastic substrate.

6. The display of claim 1, 2, or 3, wherein said first and second LCD matrices each respectively comprise a plastic substrate.

7. The display of claim 6, wherein said plastic substrate comprises polyester.

8. The display of claim 1 or 3, further comprising means for blacklighting said LCD matrices.

9. The display of claim 1, 2 or 3, wherein each said polarizer comprises polyvinyl alcohol embedded in polyester.

10. A graphics display, comprising:
    front and back LCD matrices, each of said LCD matrices comprising:
      (a) a plurality of parallel data lines within a first plane,
      (b) a plurality of parallel scan lines within a second plane,
      (c) said first and second planes parallel and spaced apart to form a planar cavity therebetween,
      (d) said first and second planes oriented so said data lines appear perpendicular to and to cross said scan lines when said lines are viewed along a direction perpendicular to said first and second planes, and
      (e) liquid crystal material in said cavity
    said front and back LCD matrices positioned with said first and second planes of said front LCD matrix parallel to said first and second planes of said back LCD matrix and oriented so each of said data lines of said front LCD matrix appears to coincide with a corresponding one of said data lines of said back LCD matrix and each of said scan lines of said front LCD matrix appears to coincide with a corresponding one of said scan lines of said back LCD matrix when said lines are viewed along a direction perpendicular to said planes,
    a polarizer between said front and back LCD matrices, and
    means for driving each of said data and scan lines of said front LCD matrix with signals corresponding to signals driving said corresponding one of said data and scan lines of said back LCD matrix.

* * * * *